United States Patent
Shelcoviz et al.

(10) Patent No.: US 8,701,693 B2
(45) Date of Patent: Apr. 22, 2014

(54) NOZZLE CHECK VALVE

(75) Inventors: Abraham Shelcoviz, Irvine, CA (US); Haykaz Mkrtchyan, Northridge, CA (US)

(73) Assignee: Curtiss-Wright Flow Control Corp, Falls Church, VA (US)

( * ) Notice: Subject to any disclaimer, the term of this patent is extended or adjusted under 35 U.S.C. 154(b) by 578 days.

(21) Appl. No.: 12/977,357

(22) Filed: Dec. 23, 2010

(65) Prior Publication Data

US 2012/0160346 A1     Jun. 28, 2012

(51) Int. Cl.
*E03B 7/07*     (2006.01)

(52) U.S. Cl.
USPC ............... 137/1; 137/517; 137/559; 137/498

(58) Field of Classification Search
USPC ......... 137/517, 559, 541, 522, 498, 523, 528, 137/535, 1; 73/865.8
See application file for complete search history.

(56) References Cited

U.S. PATENT DOCUMENTS

| | | | |
|---|---|---|---|
| 2,699,799 A * | 1/1955 | Wager | 137/498 |
| 2,850,039 A * | 9/1958 | Johnson | 137/517 |
| 3,114,391 A * | 12/1963 | Kurtz | 137/599.18 |
| 3,794,077 A * | 2/1974 | Fanshier | 137/513.3 |
| 4,105,044 A | 8/1978 | Davitt | |
| 4,638,832 A | 1/1987 | Mokveld | |
| 4,699,166 A * | 10/1987 | Gold et al. | 137/2 |
| 4,747,426 A | 5/1988 | Weevers | |
| 4,766,929 A | 8/1988 | Yaindl | |
| 5,226,445 A | 7/1993 | Surjaatmadja | |
| 5,921,276 A | 7/1999 | Lam et al. | |
| 6,742,539 B2 | 6/2004 | Lyons | |
| 2009/0250123 A1 | 10/2009 | Matsubara et al. | |
| 2010/0101668 A1 | 4/2010 | Roorda | |

OTHER PUBLICATIONS

Ballun, John V., "A Methodology for Predicting Check valve Slam," Journal AWWA, 99:3, Mar. 2007, pp. 61-65.

* cited by examiner

*Primary Examiner* — Kevin Lee
*Assistant Examiner* — Macade Brown
(74) *Attorney, Agent, or Firm* — Pearne & Gordon LLP

(57) ABSTRACT

A check valve includes a valve body having a valve seat, a diffuser, a disc coupled to the diffuser, and a compression spring. The diffuser is positioned inside the valve body and has a forward face. The disc is coupled to and movable relative to the diffuser and has an upstream face and a downstream face. The compression spring biases the disc into a normally open position during forward flow. A check valve apparatus further comprises at least one test bore through the valve member in communication with the disc. A method for testing the operation of a passive check valve is also disclosed.

19 Claims, 5 Drawing Sheets

NOZZLE CHECK VALVE

FIELD OF THE INVENTION

The technology described herein relates to a passive check valve.

BACKGROUND OF THE INVENTION

Passive check valves are known. There are numerous types of passive check valves, including flap-type valves, ball valves, and disc valves. Known disc check valves are typically biased closed via a spring or other mechanism. Liquid that flows against the disc during normal operation opens the valve, allowing liquid to flow through the valve in a forward direction. If the liquid reverses flow so that there is no longer any flow in the forward direction, the disc slams closed because the spring biases the disc into a closed position. This prevents the valve from flowing in an unintended direction.

Passive check valves are commonly used in piping systems to prevent backflow from damaging systems that are upstream of the valve. For example, check valves can be used in a piping system that includes a pump that is positioned upstream of the check valve. Should flow reverse, it is important that the reversing flow not be permitted to engage the pump. Reverse flow into the turbine of a pump could cause serious damage to the pump.

Passive check valves are also utilized in nuclear power plants. In nuclear power plants, a flow path is coupled to the nuclear-reactor that will allow cooling water to enter a containment center in the event of an accident. Flow is permitted from the cooling reservoir into the containment center in order to cool the reactor. However, reverse flow is highly undesirable since it will potentially allow hot, radioactive material to flow outside the containment center. Passive check valves are utilized in systems such as this in order to prevent the reverse flow of fluid through the check valve. The USA Nuclear Regulatory Commission requires maintaining plant safety. Those requirements include, among other things, plant operating procedures that require that check valves and other safety-related equipment be tested periodically to verify proper operation. This results in increased safety and reliability in the design of nuclear power plants.

Check valves in nuclear plant systems may often sit idle for years. It is important that they be tested to confirm that they will work in the event of an accident.

SUMMARY OF THE INVENTION

In accordance with the teachings described herein, an example check valve is shown and described. A method for testing a check valve is also described.

In accordance with one aspect, the present invention provides a check valve including a valve body having a valve seat, a diffuser, a disc, and a compression spring biasing the disc into a normally open position during forward flow. The diffuser is positioned inside the valve body. The disc is coupled to and movable relative to the diffuser.

In accordance with another aspect, the present invention provides a check valve apparatus for confirming closure of the valve under low flow situations. The apparatus includes a valve body, a valve member positioned in the valve body, a movable disc and at least one test channel. The movable disc is coupled to the valve member and movable relative thereto. The at least one test channel has an external inlet, with the channel extending through the valve member and being in communication with the disc.

In accordance with another aspect, the present invention provides a method for testing the operation of a passive check valve having a test channel that extends between an inlet and an outlet. The inlet is positioned on an outer surface of the check valve and the outlet is positioned inside the check valve. The check valve includes a movable disc that is positioned adjacent the exit of the test channel. The method includes inserting a fluid into the test channel such that the fluid impacts a surface of the disc to move the disc into a closed position; and confirming that the disc has moved into a closed position by determining whether flow is permitted through the check valve. The method also includes inserting a testing stick into an external test port in the valve body such that the testing stick touches the upstream surface of the disc. The extended portion of the testing stick that is positioned outside the valve is used along with pre-established markings to reveal the disc position inside the valve.

BRIEF DESCRIPTION OF THE DRAWING FIGURES

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
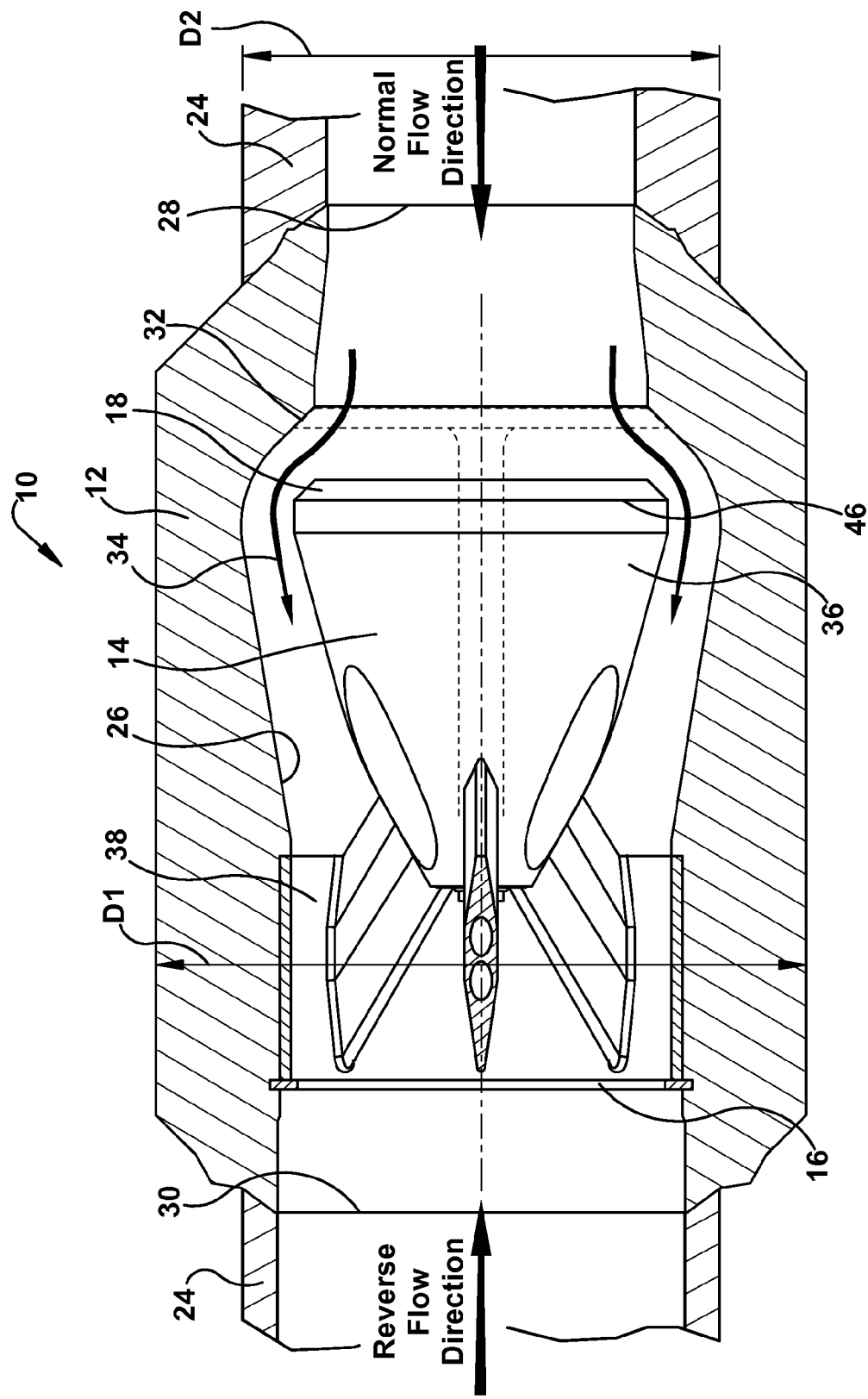
FIG. 1 is a cut-away view of the interior of a piping system that incorporates an example check valve.

The technology described herein relates generally to a passive check valve. Check valves of this sort may be used in piping systems, such as those in commercial nuclear power plants, where shut off of the valve is critical in back flow situations in order to avoid catastrophic failure. It is desirable to have passive check valves in the event of power or other failures, such that the check valve will close regardless of external factors and does not require access to electricity or manual operator input in order to close.

Space limitations often require compact designs for check valves. In addition, valve operation performance must be verifiable via testing, which typically occurs during plant outages, with no ability to have actual operational flow conditions.

Referring to the figures, the example valve 10 includes a valve body 12, a diffuser 14, a diffuser retaining ring 16, a disc 18, a spring 20, spring holder 60, and a spring holder retaining ring 22. The valve body 12 is a cylindrical member that holds internal parts of the check valve 10 and that may be coupled at either end to a pipeline 24. The valve body 12 may have the same diameter D1 as the pipeline diameter D2, a greater diameter than the pipeline, or a smaller diameter than the pipeline. The valve body 12 includes an interior surface 26 that is shaped to fit the diffuser 14 and includes an inlet 28 and an outlet 30. The interior surface 26 includes a flow guiding surface, a flow diverging surface, a disc seating surface or valve seat 32, and a flow converging surface (from front to rear of the flow channel). The valve seat 32 is spaced downstream from the inlet 28. A flow path 34 is formed inside the valve body 12 around the diffuser 14. This flow path is shaped to create minimal pressure loss to the flowing fluid.

Figure 2:
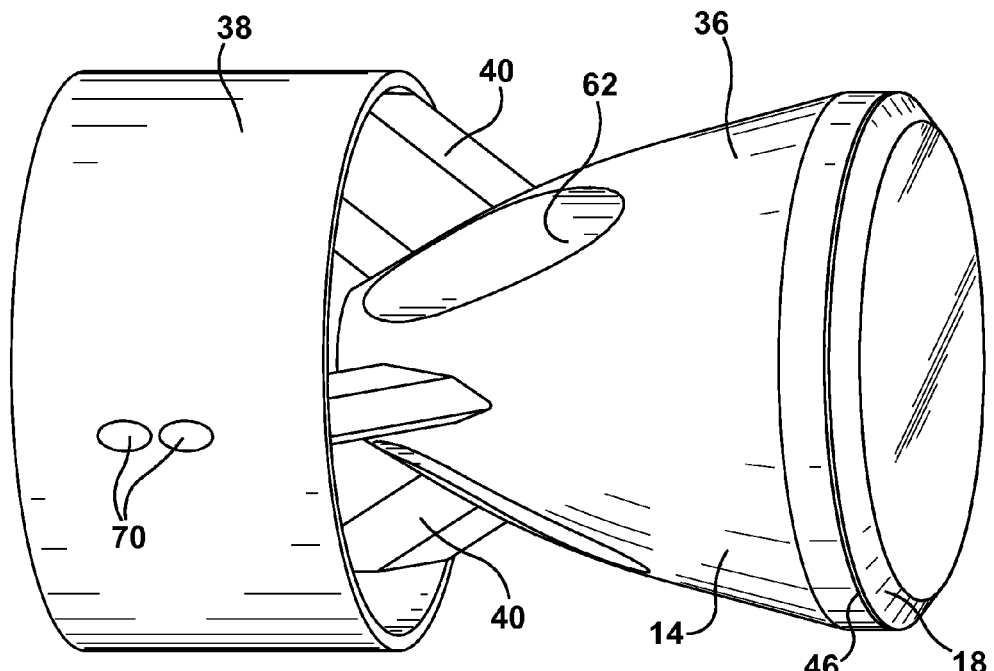
FIG. 2 shows a perspective view of a diffuser for use with the example check valve of FIG. 1, showing the disc position when the valve is in an open position.
Figure 3:
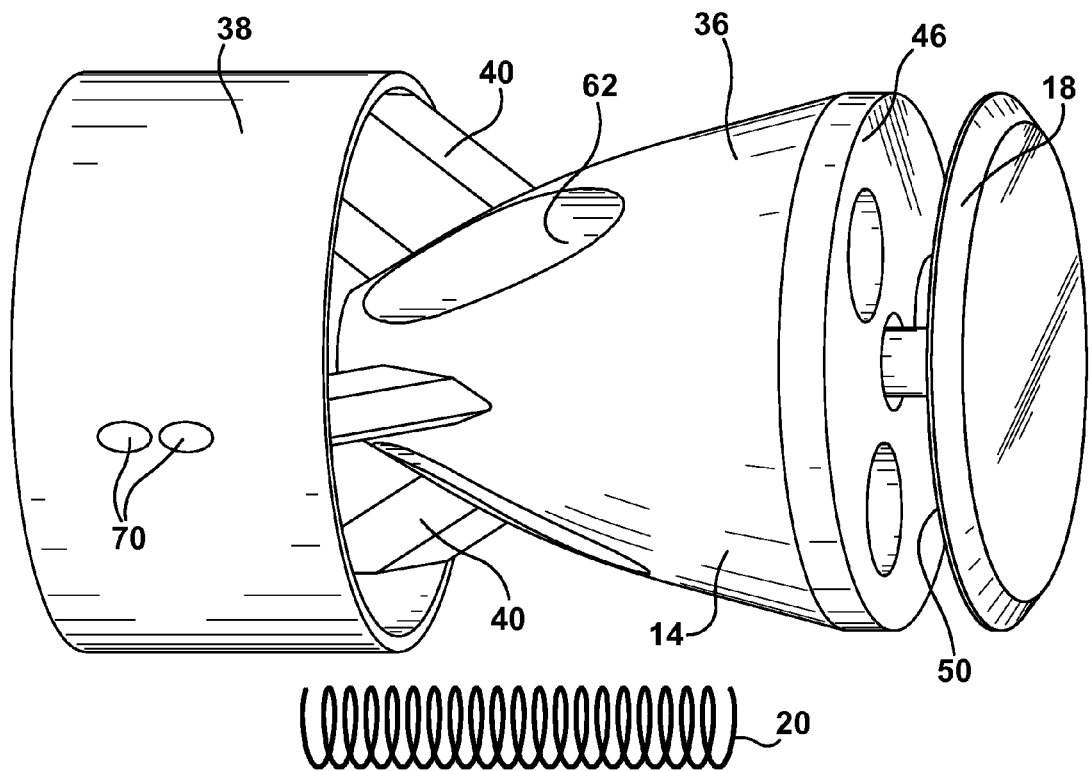
FIG. 3 shows the diffuser of FIG. 2 where the valve is in a closed position, and a spring that is in a lesser compressed position than normally compressed inside a cavity within the diffuser.

FIGS. 2 and 3 show perspective views of the diffuser. The diffuser 14 is positioned inside the valve body 12 downstream of the valve seat 32. The diffuser 14, which is shown more clearly in FIGS. 2 and 3, has a cone-shaped flow diverter 36 at one end and a cylindrical bearing ring 38 at the other end. The conical diverter 36 is positioned upstream from the cylindrical bearing ring 38. The cylindrical bearing ring 38 is positioned upstream of the valve outlet 30. The cylindrical bearing ring 38 includes ribs or supports 40 that couple the conical diverter 36 to the cylindrical bearing ring 38. The example shown includes three such rib supports 40.

The valve body 12 includes a cylindrical ledge 42 that the upstream end of the cylindrical bearing ring 38 of the diffuser 14 seats against. Then a diffuser circular retaining ring 16 is positioned inside the valve body 12 at the downstream end of the cylindrical bearing ring 38 and holds the diffuser 14 inside the valve body 12 against the ledge 42. As is evident from FIG. 4, the flow path 34 is created around the front edge 46 of the diffuser 14. The flow path 34 then leads through the cylindrical bearing ring 38 so that flow can exit the valve body 12 at the outlet 30.

Figure 4:
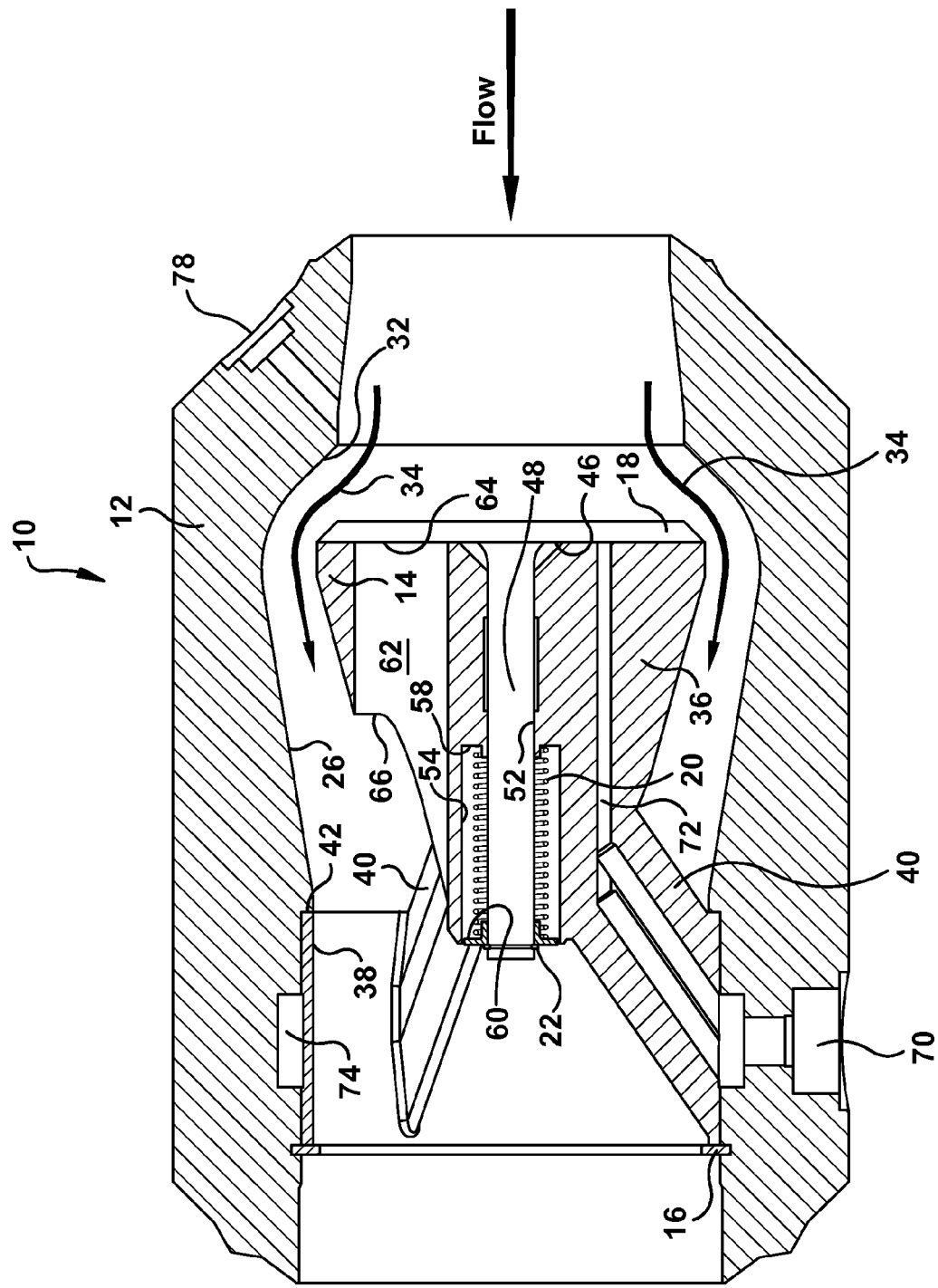
FIG. 4 is a cross-sectional view of the example check valve with the diffuser installed therein in a no-flow or forward flow position.
Figure 5:
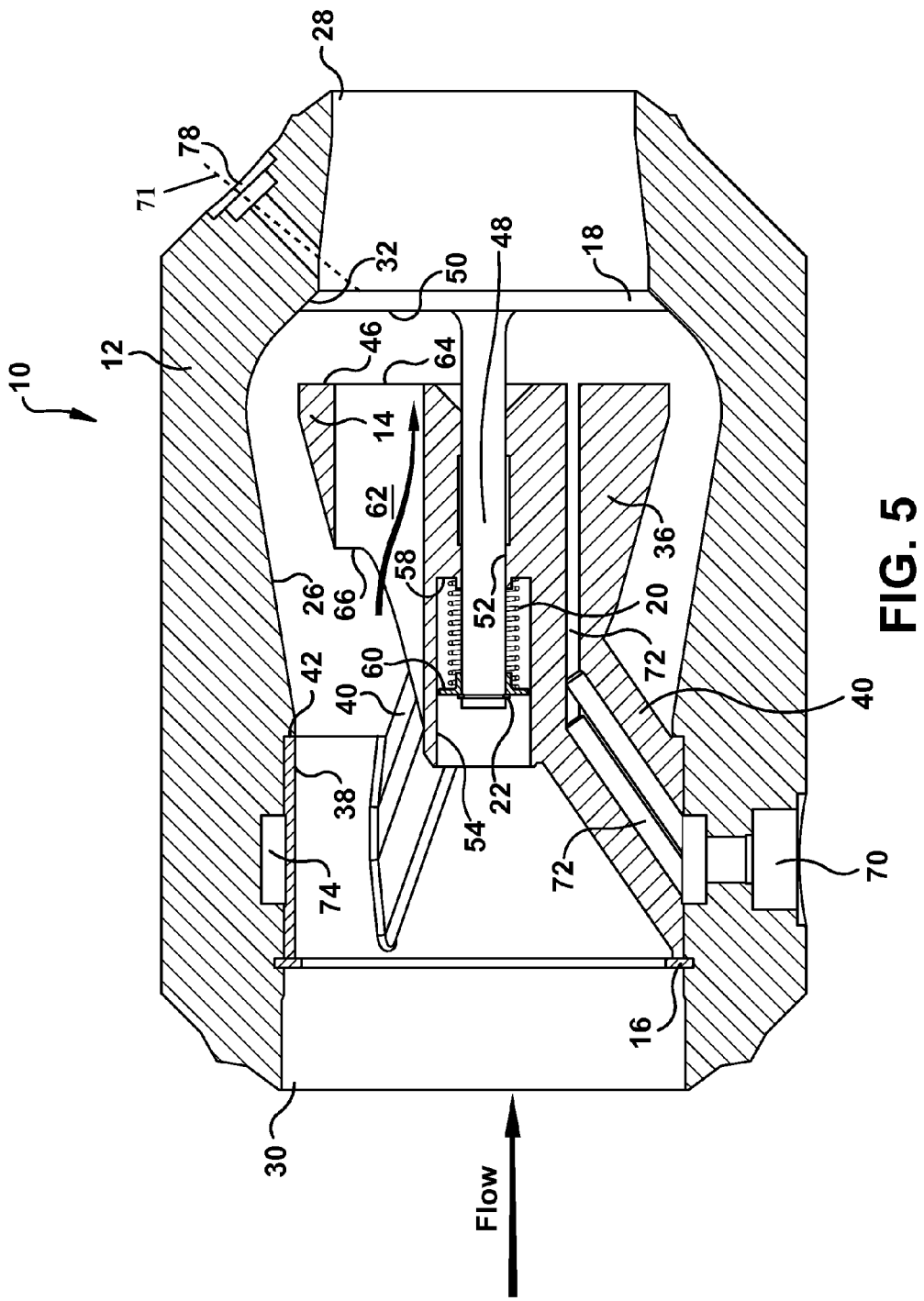
FIG. 5 is a cross-sectional view of the example check valve with flow in a reverse direction.

Referring to FIGS. 4 and 5, the valve body 12 and the diffuser 14 are stationary and do not change position in any mode of operation. The disc 18 and spring 20 are the active components of the valve. The disc 18 is coupled to a shaft or stem 48 at the rear, downstream face 50 of the disc 18. The disc 18 and stem 48 may be fabricated as one piece, as shown in the drawings, or may be formed separately. The stem 48 extends axially in a passageway 52 defined in the center of the diffuser 14. The stem 48 is movable axially within the passageway 52 such that the disc 18 is movable toward and away from the upstream, forward face 46 of the diffuser 14.

The diffuser 14 includes an inner axially extending cavity 54 for housing a compressed spring 20. A spring holder retaining ring 22 holds the spring holder 60 to the end of the stem 48 in the cavity 54. The spring holder 60 also serves as a base for the spring 20. An abutment 58 is also formed at the forward, upstream end of the cavity 54 and the other end of the spring 20 seats around the abutment 58 to hold the spring 20 in place within the cavity. The spring 20 biases the stem 48 in a downstream direction, so that the disc 18 is normally seated against the face 46 of the diffuser 14. Thus, the valve 10 is normally in an open position, which means that the disc 18 is positioned against the face 46 of the diffuser 14 and is not seated against the upstream valve seat 32.

The spring 20, shown in an uncompressed state in FIG. 3, is a compression spring, which means that the spring 20 becomes shorter when under load. The spring 20 is coiled and its turns (loops) are not touching when the valve is in open or closed position. As mentioned above, the upstream end of the spring 20 is positioned around an abutment 58 that is positioned at the upstream end of the cavity. In addition, the downstream end of the spring 20 seats around the spring holder 60 that is held in place by the spring holder retaining ring 22.

The diffuser 14 includes functional reverse flow paths or passageways 62 that are through bores that extend axially through a rear side of the conical diverter 36 to the leading edge 46 of the diffuser 14. Three reverse flow passageways 62 may be provided 120 degrees from one another. Alternatively, more or less reverse flow passageways 62 may be provided. The reverse flow passageways 62 extend through the conical diverter 36 and each of the passageways 62 has a leading edge end 64 and a downstream, rear end 66. The leading edge end 64 of the diffuser 14 abuts the downstream side 50 of the disc 18 when the valve 10 is in an open position.

As an alternative to the reverse flow through bores 62, or in addition to it, the disc 18 may have an outer diameter that is greater than an outer diameter of the diffuser 14 (not shown). When reverse flow occurs through the valve 10, the flow will initially impact the part of the disc 18 that has a larger diameter than the diffuser and force the disc to close against the valve seat 32.

In operation, when reverse flow occurs through the pipe line 24, liquid will flow through the reverse flow passageways 62 of the diffuser 14 and also around the outer sides of the leading edge 46 of the diffuser 14. When the reverse flow impacts the downstream face 50 of the disc 18, the force created by the flow on the disc 18 pushes the disc 18 upstream until it mates with the valve seat 32 defined on the valve body 12. Thus, the diffuser 14 remains stationary and the only parts that move during valve closure are the disc/stem 18/48 and the spring 20. The disc 18 and stem 48 may be integrally formed together or could be welded or otherwise connected together.

The disc 18 is movable into a closed position in response to fluid flow against the downstream side 50 of the disc 18. Reverse fluid flow-induced force against the downstream side 50 of the disc 18 forces the disc 18 to move into a closed position. As the reverse fluid flow decreases below a predetermined closure velocity, the disc 18 is returned to a seated position against face 46 of the diffuser 14 (or open position) by the force of the spring 20, which normally biases the valve 10 open.

When the valve 10 is in the closed position, the backpressure of the fluid holds the disc 18 against the valve seat 32. When the backpressure is relieved, the disc 18 moves back and seats against the diffuser 14, thus returning to its fully open position, shown in FIG. 4.

The valve body 12 may be welded or flanged or otherwise connected to the adjacent piping 24. When the valve 10 is closed, it serves as a pressure boundary between the upstream and downstream sides of the piping 24. The diffuser 14 acts as a guide for the disc 18 and also minimizes the pressure drop across the valve 10 due to it hydrodynamic geometry. The spring 20 applies continuous compressive force that keeps the disc 18 seated against the diffuser 14 and the valve 10 open unless the reverse flow induced force is greater than the spring force.

The shape of the diffuser 14 provides very low resistance to flow (pressure drop) in the normal, forward flow direction. The check valve 10 is designed so that minimal flow is allowed in the reverse flow direction, prior to valve closure. The reason for this is, in the case of a pipe break or other failure downstream of the valve, it is desirable to prevent radioactive fluid from traveling out of the nuclear reactor. In the case where a pump is positioned upstream of the valve 10, it is desired to avoid reverse flow so that the pump is not damaged.

The example valve 10 is passive and requires no flow to stay fully open. This is desirable in nuclear power plants, where valves 10 are used primarily in accident conditions to allow water to flow from the emergency tank into the containment unit. In this type of application, during normal plant operation, liquid is not flowing through the valve 10, yet the valve 10 remains open. No change in internal valve parts position relative to each other occurs when plant conditions change from normal to emergency and fluid is flowing through valve 10.

The example valve design is concentric and symmetrical with a compact design. The valve diameter D1 is only about 70% larger than the connecting pipe diameter D2. The valve 10 has a high flow coefficient (Cv) compared to traditional normally open nozzle check valves.

Figure 6:
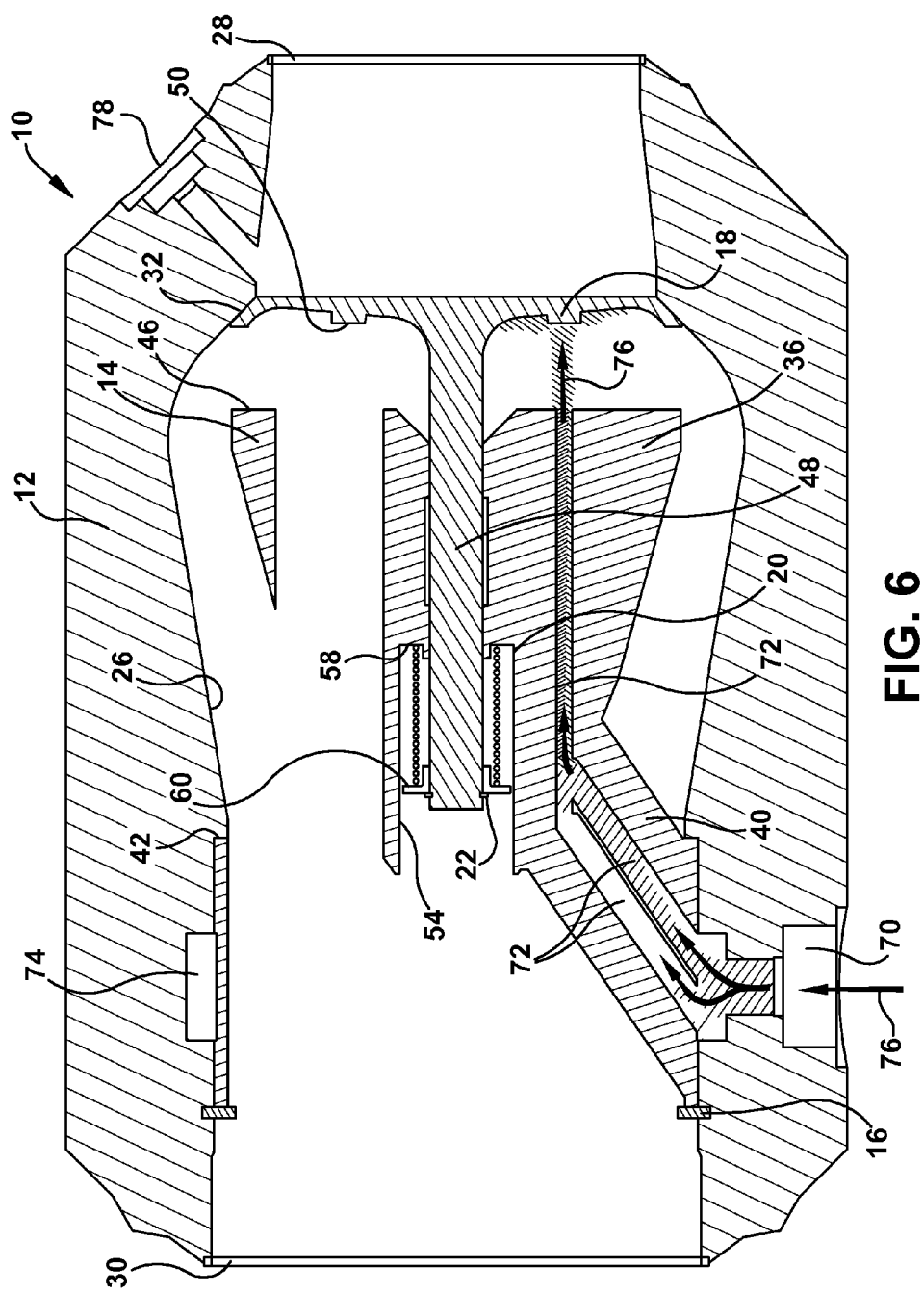
FIG. 6 depicts the flow through the testing port of the example check valve.

The example check valve 10 also includes valve closure verification, shown best in FIG. 6. It is often desirable to be able to test check valves to confirm that they are operational. The example valve 10 allows for testing without requiring full flow operation. In a preferred example, the valve 10 allows for verification with fluid flow that is less than about 20% of pipe stream closure velocity. In other examples, the fluid flow may be less than 40% or less than 60%, as long as the fluid flow is less than the normal operational fluid flow. Thus, the example check valve 10 allows for verification of valve closure with simulated fluid flow in the valve pipe line, that is less than the normal reverse flow.

Valve 10 closure verification is provided via a test port 70 that is defined on an external surface of the valve body 12 and extends into and through the diffuser 14 via one or more internal channels 72 that extend to the face 46 of the diffuser 14. The port 70 and channels 72 allow the valve 10 to be tested for proper operation using low flows, such as the flow levels mentioned above. The inlet port 70 may be positioned anywhere around the vale, but an example position is shown in FIGS. 4-6 at the bottom of the valve 10, as shown in FIG. 5. An internal cylindrical channel 74 extends around the inner surface 26 of the valve body 12 and communicates with channels 72 defined in the three ribs 40 of the diffuser 14, although only one channel 72 is shown, any number of channels 72 may be provided. For example, if four diffuser ribs 40 were utilized, then four test channels 72 could be provided. In the example shown, three ribs 40 are provided in the diffuser 14 so that three test channels 72 are utilized. The port is shown as being at the bottom of the valve 10, but could be positioned at any location on the valve 10.

In operation, fluid 76 is forced in through the port 70 and enters the cylindrical channel 74 in body 12 where it is divided into three flow paths that continue through the diffuser channels 72 in the diffuser 14 to the face 46 of the diffuser 14, where the flow exits the flow paths. At this stage, accelerated fluid impacts the downstream 50 disc surface 50 and pushes the disc 18 to a closed position, shown in FIG. 5, against the valve seat 32. The ability of the valve 10 to close under low flows relative to pipe flow, along with its hydrodynamic design, is a very desirable feature. The three ribs are 120 degrees apart and the cylindrical groove 74 that extends around the diffuser 14 links the three passageways 72.

The valve 10 closure verification mechanism allows an operator to test the operation of the check valve 10 to confirm that it will close during an accident condition. This testing may occur with less flow than is normally required during an accident condition. In addition, testing can occur when there is no reverse flow and much less fluid is utilized to test the operation of the valve 10 than is normally required to close the valve 10. This makes testing easier and more manageable. FIG. 6 shows a flow stream for the testing fluid as it impacts the downstream side 50 of the disc 18.

The velocity and flow associated with the flow through the test channels 72 is about 2 to 10 times smaller than normal reverse flow velocity. For this reason, substantially less flow is needed in order to test the valve 10.

As an alternative to the valve closure verification mechanism discussed above, the operator may use port 78, shown in FIG. 5, for verifying the valve position. A test stick 71, schematically shown in dashed lines in FIG. 5, similar to a dipstick, may be utilized that has pre-established markings on the test stick. When the operator inserts the test stick 71 into the port 78 and the test stick 71 hits the face of disc 18, the position of the face of the disc 18 can be determined. The test stick 71 may also be used to press against the face of the disc 18 in order to confirm that once the disc 18 leaves the valve seat 32, it can resume its original position against the valve seat 32 once pressure applied by the test stick 71 is released.

The valve and its components are typically made of a non-corrosive material, such as stainless steel. The spring may also be made of stainless steel. The body, the diffuser, and the disc and stem assembly each are typically formed as a single integral piece, with the raw material being a casting, bar stock or forging, machined to the final dimensions. They may alternatively be formed separately. Other materials may also be used, as known by those of skill in the art. Any known manufacturing method may be utilized for forming the various part of the valve.

The valve may be coupled to the piping using any known means. There are industry standards for connection valves to pipes (with a common standard being ANSI B16.5). These standards define flange type connections or weld type connections. For a given pipe size, there may be several different flanges based on the pressure class of the pipe and valve, with piping being thicker and the flange being larger for higher pressure operations. Each valve may be designed based upon customer specification, so the connection method for connecting the valve to the piping is not critical to the invention. Examples of connections are butt welding and bolted flanges. The valve body will typically have a diameter that is greater than a diameter of the piping.

The term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A check valve apparatus comprising:
   a valve body defining a flow path;
   a valve member positioned within the flow path of the valve body;
   a movable disc coupled to the valve member and movable with respect to the valve member within the flow path;
   a compression spring configured to bias the movable disc into an open position and wherein the movable disc is configured to move to a closed position against the bias of the compression spring in response to a reverse flow through the flow path; and
   at least one first test channel including a single continuous pathway extending through the valve body and in communication with the flow path by a single internal inlet, wherein the pathway is configured to receive a test stick for inserting through the pathway of the test channel to engage the disc.

2. The check valve apparatus of claim 1, further comprising at least one second test channel in fluid communication with an external port outside of the flow path, wherein the movable disc is configured to move to the closed position against the bias of the compression spring in response to a fluid flowing through the second test channel from the external port.

3. The check valve apparatus of claim 2, wherein the valve body includes a cylindrical feed channel in fluid communication with the external port and the second test channel.

4. The check valve apparatus of claim 2, wherein the at least one second test channel comprises a plurality of second test passages, with each second test channel passage being defined in a corresponding one of a plurality of coupling ribs.

5. The check valve apparatus of claim 1, wherein the valve member comprises a diffuser with a conical flow diverter.

6. The check valve apparatus of claim 5, wherein the conical flow diverter includes an upstream face and the compression spring biases a downstream face of the movable disc against the upstream face of the conical flow diverter in the open position.

7. The check valve apparatus of claim 6, wherein the diffuser includes at least one axial bore configured to receive a reverse flow through the flow path to act against the downstream face of the movable disc to bias the disc toward the closed position against the bias of the compression spring.

8. A check valve apparatus comprising:
a valve body defining a flow path;
a valve member positioned within the flow path of the valve body;
a movable disc coupled to the valve member and movable with respect to the valve member within the flow path;
a compression spring configured to bias the movable disc into an open position and wherein the movable disc is configured to move to a closed position against the bias of the compression spring in response to a reverse flow through the flow path; and
at least one first test channel in fluid communication with an external port outside of the flow path, wherein the movable disc is configured to move to the closed position against the bias of the compression spring in response to a fluid flowing through the test channel from the external port.

9. The check valve apparatus of claim 8, further comprising at least one second test channel including a pathway with an external inlet and an internal inlet in communication with the flow path, the pathway extending through the valve member, wherein the pathway is configured to receive a test stick for inserting through the pathway of the test channel to engage the disc.

10. The check valve apparatus of claim 9, wherein the pathway of the second test channel comprises a single continuous pathway and the internal inlet comprises a single internal inlet.

11. The check valve apparatus of claim 8, wherein the valve body includes a cylindrical feed channel in fluid communication with the external port and the first test channel.

12. The check valve apparatus of claim 8, wherein the at least one first test channel comprises a plurality of first test channels, with each first test channel being defined in a corresponding one of a plurality of coupling ribs.

13. The check valve apparatus of claim 8, wherein the valve member comprises a diffuser with a conical flow diverter.

14. The check valve apparatus of claim 13, wherein the conical flow diverter includes upstream face and the compression spring biases a downstream face of the movable disc against the upstream face of the conical flow diverter in the open position.

15. The check valve apparatus of claim 14, wherein the diffuser includes at least one axial bore configured to receive a reverse flow through the flow path to act against the downstream face of the movable disc to bias the disc toward the closed position against the bias of the compression spring.

16. A method for testing a check valve apparatus including a movable disc positioned within a flow path of the check valve apparatus, wherein the movable disc is biased into an open position with a biasing device, and wherein the disc is configured to be moved to a closed position against the bias of the biasing device to close the flow path of the check valve apparatus, the check valve apparatus including at least one first test channel extending between an inlet and an outlet of the first test channel, with the inlet being positioned on an outer portion of the check valve apparatus and the outlet being positioned inside the check valve apparatus in communication with the flow path, the method comprising:
inserting an end of a test stick into the inlet of the first test channel, through a pathway of the first test channel, and out the outlet of the first test channel in a direction transverse to a direction of the flow path to engage a surface of the disc within the flow path; and
confirming a location of the disc within the flow path by engaging the surface of the disc with the end of the test stick.

17. The method of claim 16, wherein the check valve apparatus further includes at least one second test channel in fluid communication with an external port outside of the flow path, wherein the method further includes the step of flowing fluid through the second test channel from the external port to move the movable disc to the closed position.

18. A method of testing a check valve apparatus comprising a valve body defining a flow path, a valve member positioned within the flow path, a movable disc coupled to the valve member and movable relative to the valve member within the flow path, a compression spring biasing the movable disc into an open position and wherein the movable disc is configured to move to a closed position against the bias of the compression spring in response to a reverse flow through the flow path, and at least one first test channel in fluid communication with an external port outside of the flow path, wherein the method comprises:
flowing fluid through the test channel from the external port to move the movable disc to the closed position against the bias of the compression spring.

19. The method of claim 18, wherein the check valve apparatus further includes at least one second test channel extending between an inlet and an outlet of the second test channel, with the inlet being positioned on an outer portion of the check valve apparatus and the outlet being positioned inside the check valve apparatus in communication with the flow path, the method comprising:
inserting an end of a test stick into the inlet of the second test channel, through a pathway of the second test channel, and out the outlet of the second test channel in a direction transverse to a direction of the flow path to engage a surface of the disc within the flow path; and
confirming a location of the disc within the flow path by engaging the surface of the disc with the end of the test stick.

* * * * *